United States Patent
Witting et al.

(10) Patent No.: US 10,670,101 B2
(45) Date of Patent: Jun. 2, 2020

(54) LINEAR MOTION SYSTEM

(71) Applicant: SAINT-GOBAIN PERFORMANCE PLASTICS CORPORATION, Solon, OH (US)

(72) Inventors: Nicholas F. Witting, Clark, NJ (US); Vincent Dimartino, Clifton, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 168 days.

(21) Appl. No.: 15/741,078

(22) PCT Filed: Jun. 27, 2016

(86) PCT No.: PCT/US2016/039517
§ 371 (c)(1),
(2) Date: Dec. 29, 2017

(87) PCT Pub. No.: WO2017/003914
PCT Pub. Date: Jan. 5, 2017

(65) Prior Publication Data
US 2018/0187735 A1 Jul. 5, 2018

Related U.S. Application Data

(60) Provisional application No. 62/186,160, filed on Jun. 29, 2015.

(51) Int. Cl.
*F16F 9/00* (2006.01)
*B62K 25/08* (2006.01)
(Continued)

(52) U.S. Cl.
CPC .............. *F16F 9/006* (2013.01); *B62K 25/06* (2013.01); *B62K 25/08* (2013.01); *F16F 9/366* (2013.01);
(Continued)

(58) Field of Classification Search
CPC .... F16F 9/006; F16F 9/366; F16F 2224/0291; F16F 2222/12; F16F 2222/04; F16F 2224/04; B62K 25/06; B62K 25/08
(Continued)

(56) References Cited

U.S. PATENT DOCUMENTS 2,995,462 A 8/1961 Mitchell et al.
3,994,814 A 11/1976 Cairns
(Continued)

FOREIGN PATENT DOCUMENTS

EP 2241773 A2 10/2010
EP 2390052 B1 1/2014
(Continued)

OTHER PUBLICATIONS

JP-2013083302-A, Niizaki, Shinya, Slide Bearing Made of Graphite Added Resin-Based Material, for Automatic Transmission May 2013, (Machine Translation) (Year: 2013).*
(Continued)

*Primary Examiner* — Jacob D Knutson
*Assistant Examiner* — Felicia L. Brittman
(74) *Attorney, Agent, or Firm* — Abel Schillinger, LLP; Chi Suk Kim (57) ABSTRACT

A linear motion assembly having a static coefficient of friction, $\mu_S$, as measured between an inner component and an outer component, and a dynamic coefficient of friction, $\mu_D$, as measured between the inner component and the outer component, wherein $\mu_S/\mu_D$ is less than 2.0, such as less than 1.9, less than 1.8, less than 1.7, or even less than 1.6.

18 Claims, 3 Drawing Sheets

(51) Int. Cl.
  *F16F 9/36* (2006.01)
  *B62K 25/06* (2006.01)
(52) U.S. Cl.
  CPC ....... *F16F 2222/04* (2013.01); *F16F 2222/12* (2013.01); *F16F 2224/0291* (2013.01); *F16F 2224/04* (2013.01)
(58) Field of Classification Search
  USPC ....................................................... 280/276
  See application file for complete search history.

(56) References Cited

U.S. PATENT DOCUMENTS

| | | | |
|---|---|---|---|
| 4,394,275 | A | 7/1983 | Bickle et al. |
| 4,683,099 | A | 7/1987 | Buxton et al. |
| 5,888,214 | A | 3/1999 | Ochoa |
| 5,971,617 | A | 10/1999 | Woelki et al. |
| 6,893,037 | B1 | 5/2005 | Galasso |
| 7,591,475 | B1 | 9/2009 | Calfee |
| 2002/0100238 | A1 | 8/2002 | Ochoa |
| 2002/0158424 | A1 | 10/2002 | Yanagiguchi et al. |
| 2004/0084871 | A1* | 5/2004 | Galasso ................ B62K 25/08 280/276 |
| 2007/0149299 | A1 | 6/2007 | Azuma et al. |
| 2007/0164151 | A1 | 7/2007 | Luce |
| 2009/0067766 | A1 | 3/2009 | Maruyama et al. |
| 2010/0130291 | A1 | 5/2010 | Ando et al. |
| 2011/0304120 | A1* | 12/2011 | Pasino ................ B62K 25/08 280/276 |
| 2012/0128280 | A1* | 5/2012 | Ortiz ................ B32B 1/08 384/129 |
| 2015/0175237 | A1 | 6/2015 | Becker et al. |
| 2016/0146347 | A1 | 5/2016 | Hunger |

FOREIGN PATENT DOCUMENTS

| | | |
|---|---|---|
| JP | 2002285141 A | 10/2002 |
| JP | 2013083302 A | 5/2013 |
| WO | 2015018536 A1 | 2/2015 |
| WO | 2017003914 A1 | 1/2017 |

OTHER PUBLICATIONS

Supplementary European Search Report for EP16818534, completed Jan. 3, 2019, 8 pages.
"Rulon® (Filled PTFE) Specifications," boedeker.com, 2014, 3 pages, Boedeker Plastics, Inc., Shiner, US.
"Filled Compounds of PTFE," catalog.fluoropolymerproducts.com, pp. 17-20, DuPont.
"Linear Bearings Turcite® Slydwaye," Nov. 2005, 15 pages, Trelleborg Sealing Solutions.
International Search Report & Written Opinion for PCT/US2016/039517, dated Sep. 30, 2016, 15 pages.

* cited by examiner

LINEAR MOTION SYSTEM

CROSS-REFERENCE TO RELATED APPLICATIONS

This application is the National Stage of International Application No. PCT/US2016/039517, entitled "LINEAR MOTION SYSTEM", by Nicholas F. WITTING et al., filed Jun. 27, 2016, which claims priority to U.S. Patent Application No. 62/186,160, entitled "LINEAR MOTION SYSTEM", by Nicholas F. WITTING et al., filed Jun. 29, 2015, of which both applications are assigned to the current assignee hereof and incorporated herein by reference in their entireties.

TECHNICAL FIELD

The present disclosure is directed to linear motion systems such as suspension assemblies.

BACKGROUND ART

Linear motion systems permit relative sliding between two or more components. An exemplary linear motion system is a suspension assembly which is generally used to absorb and mitigate the transmission of force, such as caused by an abrupt vector change in linear momentum. For this reason, suspension assemblies are typically used in vehicles to prevent the complete transfer of an impulse from the road wheels to the driver.

One particular type of suspension assembly utilizes a plurality of elements in coaxial alignment and movable with respect to one another in a telescopic manner. Such telescopic suspension assemblies may be employed in vehicles, motorcycles, bicycles, or the like to suspend a passenger or rider in an insulated manner, for example, from rough terrain. The industry continues to demand improved linear motion systems which can better insulate riders and provide a better shock absorbing force profile.

BRIEF DESCRIPTION OF THE DRAWINGS

Embodiments are illustrated by way of example and are not limited in the accompanying figures.

DETAILED DESCRPT OF THE PREFERRED EMBODIMENT(S)

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the linear motion arts.

A linear motion system in accordance with one or more of the embodiments described herein can generally include an outer component defining a bore, an inner component disposed within and translatable relative to the bore, and a bearing disposed between the inner component and the outer component. In an embodiment, the linear motion assembly can have a static coefficient of friction, $\mu_S$, as measured between an inner component and an outer component, and a dynamic coefficient of friction, $\mu_D$, as measured between the inner component and the outer component, wherein $\mu_S/\mu_D$ is less than 2.0, such as less than 1.9, less than 1.8, less than 1.7, or even less than 1.6. In another embodiment, the linear motion system can be adapted such that there are substantially no visible scratches present on the inner component after 10000 cycles. More particularly, the inner component can include a relatively soft material, e.g., aluminum, and there may be substantially no visible scratches present on the inner component after 10000 cycles.

A suspension assembly in accordance with one or more of the embodiments described herein can generally include a stanchion adapted to be partially received within a bore of a receiver, and a bearing disposed between the stanchion and the receiver. In an embodiment, the receiver and stanchion may be longitudinally translatable with respect to one another along a predetermined distance. The stanchion may be partially exposed from the receiver in an uncompressed state, and longitudinally translate into the receiver upon exhibition of a compressive force. The bearing may include a low friction material, such as a low friction polymer, adapted to reduce frictional resistance between the stanchion and receiver. In an embodiment, the bearing may include, or even consist essentially of, a fluoropolymer. In a further embodiment, the bearing may also include a filler material including a plurality of filler particles. In a particular embodiment, the filler particles may have an average shape factor of no less than 0.75. In another particular embodiment, the filler particles may be generally spherical in shape. That is, the filler particles may have a shape similar to, or coinciding with, a sphere.

In an embodiment, the filler particles may enhance bearing performance. For example, filler particles in accordance with an embodiment may increase bearing life. The filler particles may further reduce scratching or abrasion along contact surfaces with the receiver and stanchion, thus reducing particle buildup within the suspension assembly. The filler particles may also reduce a stick-slip condition, or "stiction," between the bearing, stanchion, or receiver. That is, the filler may reduce the ratio of static to dynamic coefficients of friction, resulting in a less perceptible stiction condition and manifesting in reduced jerking or binding of the suspension assembly immediately prior to, and during the initial stage of, longitudinal translation.

Figures 1, 2:
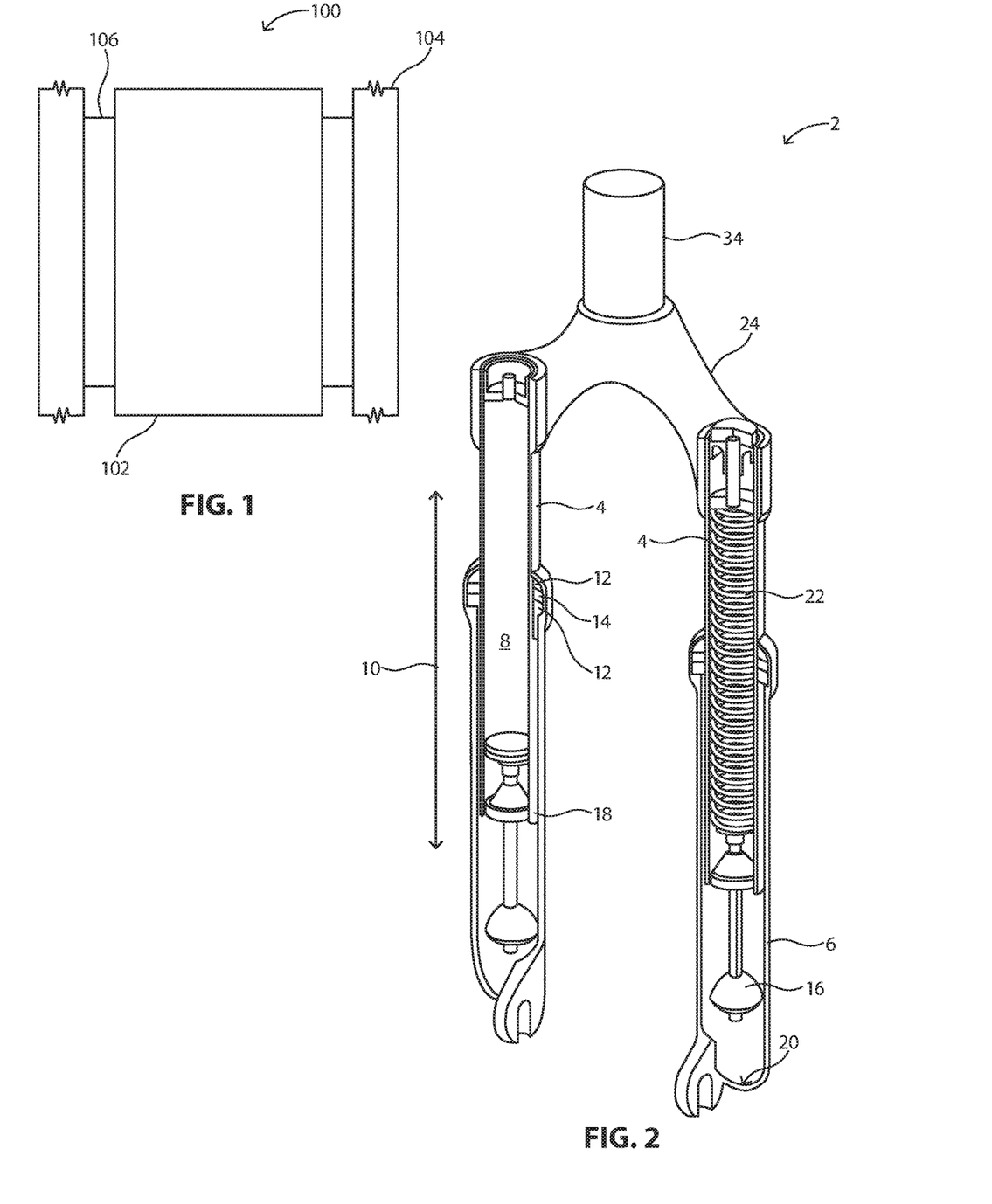
FIG. 1 includes a cross section view of a linear motion system in accordance with an embodiment.
FIG. 2 includes a partial cutaway perspective view of a suspension assembly in accordance with an embodiment.

Referring initially to FIG. 1, a linear motion assembly 100 can generally include an inner component 102, an outer component 104, and a bearing 106 disposed therebetween. In an embodiment, the linear motion assembly 100 can have a static coefficient of friction, $\mu_S$, as measured between the inner component 102 and the outer component 104, and a dynamic coefficient of friction, $\mu_D$, as measured between the inner component 102 and the outer component 104, wherein $\mu_S/\mu_D$ is less than 2.0, such as less than 1.9, less than 1.8, less than 1.7, or even less than 1.6. Low $\mu_S/\mu_D$ ratios (e.g., less than 2.0) can reduce the effects caused by stiction conditions. Low $\mu_S/\mu_D$ ratios may also prevent overshoot between the inner and outer components 102 and 104, respectively, by lowering the force necessary to start relative linear motion.

Figure 3:
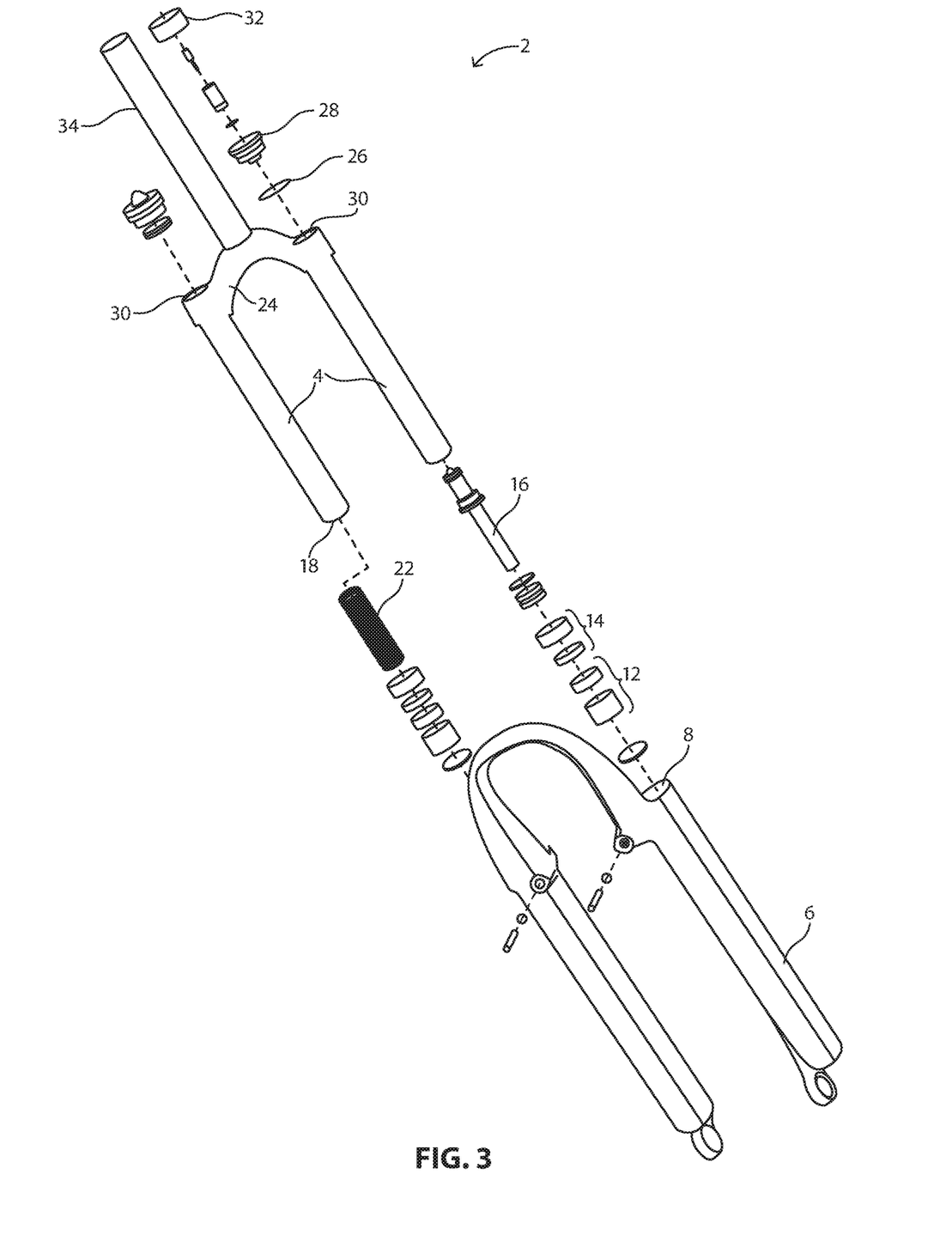
FIG. 3 includes an exploded perspective view of a suspension assembly in accordance with an embodiment.

Referring now to FIGS. 2 and 3, a suspension assembly 2 can generally include a stanchion tube 4 ("stanchion") and a receiver 6 defining a bore 8 into which the stanchion 4 is receivable. It should be understood that the herein described suspension assembly 2 is exemplary to a linear motion assembly 100. Reference made to any characteristic or feature with respect to the suspension assembly 2 is not intended to be limited to suspension assemblies, but is intended to also pertain to other linear motion assemblies, including but not limited to those systems including sliding shafts, pressure cylinders such as pneumatic and hydraulic cylinders, linear actuators, linear carriage systems, and other electrical, pneumatic, and hydraulically operated systems having components moving linearly with respect to one another.

The stanchion 4 and receiver 6 may be longitudinally translatable with respect to one another in a longitudinal direction, as indicated by line 10 in FIG. 2. The stanchion 4 may include, or consist essentially of, a metal or a metal alloy. In a particular embodiment, the stanchion 4 may include an aluminum-containing material such as aluminum, a magnesium-containing material such as magnesium, a combination thereof, or the like.

A bearing 12 can separate the stanchion 4 and receiver 6 from one another, while simultaneously providing a low friction interface therebetween. In an embodiment, the bearing 12 may include, for example, at least 1 bearing, such as at least 2 bearings, at least 3 bearings, at least 4 bearings, or even at least 5 bearings. The bearings 12 may be in coaxial alignment with one another, defining an aperture through which the stanchion 6 is receivable. In a particular embodiment, at least two adjacent bearings 12 may be spaced apart in an axial direction, for example, by a spacer. In another particular embodiment, adjacent bearings 12 may be in direct contact with one another. That is, the axial ends of the bearings 12 may touch.

A seal 14 may be in coaxial alignment with the bearing 12. The seal 14 may prevent fluid or debris from entering the bore 8 of the receiver 6. In a particular embodiment, the seal 14 may include one or more scraping surfaces to reduce entrance of hardened debris into the bore 8.

In an embodiment, a compression rod 16 may extend between a location adjacent to a longitudinal end 18 of the stanchion 4 and a bottom surface 20 of the receiver 6. The compression rod 16 may dampen transmission of force through the suspension assembly 2. One or more springs 22 can further assist dampening transmission of force. The one or more springs 22 can be in coaxial alignment with at least some of the stanchion 4, the bore 8, the bearing 12, the seal 14, or the compression rod 16.

In a particular embodiment, the suspension assembly 2 can be a fork suspension assembly, such as for example, a fork suspension assembly of a bicycle or a motorcycle. In such embodiment, the stanchion 4 may be coupled with a crown 24. In a more particular embodiment, the crown 24 may be coupled with two stanchions 4 and 4. Those of skill in the art will recognize that a fork suspension assembly can utilize a single stanchion arrangement while providing a sufficiently smooth and rigid ride. The stanchions 4 and 4 may extend from the crown 24 generally parallel with one another, i.e., the stanchions 4 and 4 can be angular offset with respect to one another by less than 10°, such as less than 8°, less than 6°, less than 5°, less than 4°, less than 3°, less than 2°, or even less than 1°.

In an embodiment, the stanchion(s) 4 may include generally hollow cylindrical bodies. A combination of seals 26 and bearings 28 may cap the upper end 30 of the stanchion. The seals 26 and bearings 28 may be secured to the upper end 30 by a stem cap 32.

A steering tube 34 may extend from one or more of the stanchions 4 or the crown 24 to a higher elevation where a user operable steering device (not illustrated) can be coupled therewith by a headset (not illustrated) or the like. By turning the user operable steering device, such as handlebars, a user may redirect the receiver 6 and thus, change direction of the vehicle.

Upon encountering an upward force as caused by, for example, rough terrain (e.g., non-planar or jagged geological formations), the receiver 6 may translate toward the stanchion 4 in a direction generally parallel with line 10 (FIG. 2) such that the longitudinal end 18 of the stanchion 4 approaches the bottom surface 20 of the receiver 6. The rate of translation may generally be determined by a combination of the angle of impact with the terrain (i.e., the angular offset from line 10) and material properties and settings within the suspension system 2. Certain vehicles include adjustable settings, allowing an operator to adjust the stiffness profile of the suspension system 2 according to environmental factors and terrain conditions, with the expectation that the chosen settings and stiffness profile will be maintained throughout the translation. Deviation from the chosen stiffness settings is often most noticeable immediately prior to and during the initial stage of translation as the stanchion-bearing interface breaks away from a static frictional characteristic and moves to a dynamic frictional characteristic. That is, the lag of longitudinal translation as caused by stiction is often the most noticeable deviation from an operator's desired settings and stiffness profile.

In accordance with one or more embodiments, stiction can be reduced within the suspension system 2 by adjusting the bearing 12, thereby resulting in a faster break-away condition and more desirable operator-adjusted suspension profile. Such a desirable stiffness profile can manifest in a smoother ride which riders have come to expect from high end, performance parts. In an embodiment, the bearing 12 has a static coefficient of friction, $\mu_S$, and a dynamic coefficient of friction, $\mu_D$, where a ratio $\mu_S/\mu_D$ is less than 2.0, such as less than 1.9, less than 1.8, less than 1.7, or even less than 1.6. In another embodiment, $\mu_S/\mu_D$ is greater than 1.0.

In an embodiment, the bearing 12 may include a low friction material. Exemplary materials include polymers, such as for example, a polyketone, a polyaramid, a polyimide, a polyetherimide, a polyamideimide, a polyphenylene sulfide, a polyphenylene sulfone, a fluoropolymer, a polybenzimidazole, a derivation thereof, or even a combination thereof. In a particular embodiment, the bearing 12 can at least partially include, or consist essentially of a polymer, such as a polyketone, a thermoplastic polyimide, a polyetherimide, a polyphenylene sulfide, a polyether sulfone, a polysulfone, a polyamideimide, a derivative thereof, or even a combination thereof. In a further embodiment, the bearing 12 can include a polyketone, such as polyether ether ketone (PEEK), polyether ketone, polyether ketone ketone, polyether ketone ether ketone, a derivative thereof, or even a combination thereof. In an additional embodiment, the bearing can include an ultra high molecular weight polyethylene.

Fluoropolymers are used according to a particular embodiment. Exemplary fluoropolymers include fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof.

Figure 5:
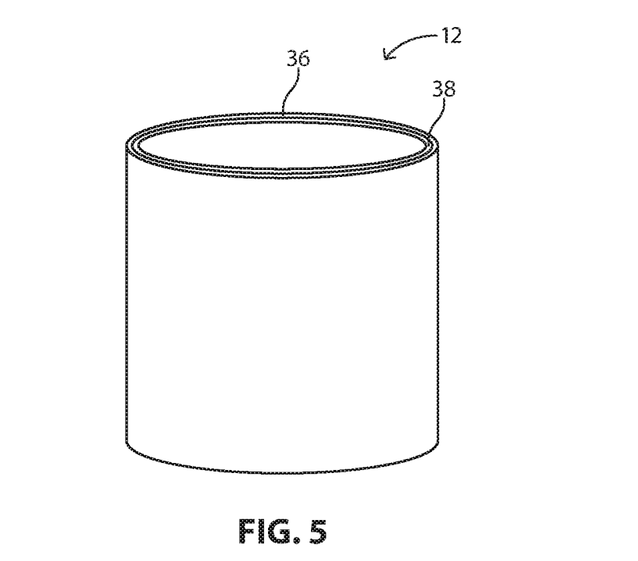
FIG. 5 includes a perspective view of a bearing in accordance with an embodiment.

Referring to FIG. 5, and in accordance with an embodiment, the bearing 12 can further include a backing 36 coupled with the low friction material 38. The backing 36 may provide structural support to the low friction material 38. In an embodiment, the backing 36 may define a space in which the low friction 38 material can creep during relative translation between the stanchion 4 and receiver 6 (FIGS. 2 and 3). The backing 36 may include a rigid and strong material, such as for example, a hard polymer, a metal, a ceramic, or the like. An exemplary backing material may include aluminum, magnesium, steel, or the like. In an embodiment, the backing 36 may be secured to the low friction material 38 for example, by an adhesive, a fastener, a mechanical feature such as a crimped or flanged portion, or the like. In an embodiment, the bearing 12 can have a unitary construction such that it is perceptibly a single component. In an embodiment, other supports and backing structures may be utilized with the bearing 12. The disclosure is not intended to be limited by the backing or backing attachment methods described above.

In accordance with an embodiment, the bearing 12 may have an inner diameter, $ID_B$, as measured prior to installation with the stanchion 4, less than an outer diameter, $OD_S$, of the stanchion 4. That is, the bearing 12 may be undersized for the stanchion 4. For example, in an embodiment, $OD_S$ can be at least 1.01 $ID_B$, such as at least 1.02 $ID_B$, at least 1.03 $ID_B$, at least 1.04 $ID_B$, at least 1.05 $ID_B$, at least 1.1 $ID_B$, or even at least 1.2 $ID_B$. In a further embodiment, $OD_S$ can be no greater than 1.5 $ID_B$, such as no greater than 1.4 $ID_B$, or even no greater than 1.3 $ID_B$. During installation of the stanchion 4, the inner diameter of the bearing 12 may increase to accommodate the outer diameter of the stanchion 4. Thus, after assembly, $ID_B$ may be equal, or approximately equal, to $OD_S$. As used herein, "approximately equal" refers to a relative offset of measurements of two objects of no greater than ±5%, such as a relative offset of no greater than ±4%, a relative offset of no greater than ±3%, a relative offset of no greater than ±2%, or even a relative offset of no greater than ±1%.

The low friction material may further include a filler material impregnated or embedded therein.

In an embodiment, the filler material may include a plurality of filler particles having an average shape factor of no less than 0.75. As used herein, "average shape factor" describes an average shape factor for 20 filler particles. As used herein, "shape factor" describes the relative cross-sectional shape of a single filler particle as compared to a smallest inscribing circle. The closer the shape factor is to 1.0, the closer the cross-sectional shape of the filler particle is to a perfect circle. A circle has a shape factor of 1.0; an equilateral triangle has a shape factor of approximately 0.413; a square has a shape factor of approximately 0.637; a pentagon has a shape factor of approximately 0.757; a hexagon has a shape factor of approximately 0.827; a heptagon has a shape factor of approximately 0.871. In a particular embodiment, the plurality of filler particles may have an average shape factor of at least 0.80, such as at least 0.85, at least 0.9, at least 0.95, at least 0.96, at least 0.97, at least 0.98, or even at least 0.99. In another embodiment, the plurality of filler particles may have an average shape factor of no greater than 1.0.

In an embodiment, the filler material may include a plurality of filler particles, each having a spherical shape. Spherical filler particles are generally recognized as those particles having generally spherical shapes, as opposed to fibers and strands which are elongated bodies having one dimension (e.g., a length) significantly greater than the other dimensions (e.g., width and height). Spherical filler particles need not have a shape factor of 1.0, but rather can have a lesser shape factor, such as 0.80, 0.82, 0.84, 0.86, 0.88, 0.90, 0.92, 0.94, 0.96, or even 0.98.

In a particular embodiment, the filler material can occupy at least 20 vol % of the bearing 12, such as at least 25 vol %, at least 30 vol %, at least 35 vol %, at least 40 vol %, at least 45 vol %, or even at least 50 vol %. In another particular embodiment, the filler material can occupy no greater than 80 vol % of the bearing 12, such as no greater than 75 vol %, no greater than 70 vol %, no greater than 65 vol %, no greater than 60 vol %, or even no greater than 55 vol %.

In a particular instance, the filler material can comprise at least 20 wt % of the bearing 12, such as at least 25 wt %, at least 30 wt %, at least 35 wt %, at least 40 wt %, at least 45 wt %, or even at least 50 wt % of the bearing 12. In another particular instance, the filler material can comprise no greater than 80 wt % of the bearing 12, such as no greater than 75 wt %, no greater than 70 wt %, no greater than 65 wt %, no greater than 60 wt %, or even no greater than 55 wt %.

A ratio of filler material to low friction material can be at least 1:4, such as at least 1:3, at least 1:2, or even at least 1:1. The ratio of filler material to low friction material can be no greater than 4:1, such as no greater than 3:1, no greater than 2:1, or even no greater than 1:1. In a particular embodiment, the ratio of filler material to low friction material can be in a range of 1:2 and 2:1. In a more particular embodiment, the ratio of filler material to low friction material can be approximately 1:1.

Exemplary filler materials include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In a particular embodiment, each of the plurality of filler particles includes, or consists essentially of, a metal. In a more particular embodiment, each of the plurality of filler particles includes, or consists essentially of, bronze. Bronze filler particles may provide the bearing 12 with a longer life and minimizes surface abrasion on other components which may occur, for example, with use of other filler materials.

Spherical bronze filler particles may increase operable life of the bearing 12 while maintaining a consistently repeatable sliding profile at the bearing-stanchion interface over lifetime use.

In accordance with one or more embodiments, the filler material may further include a second plurality of filler particles having a different property as compared to the plurality of filler particles discussed above. For example, the second plurality of filler particles may each have a different material composition or size. By way of a non-limiting example, the second plurality of filler particles may each include, or consist essentially of, a material listed above different from the selected material of the previously discussed plurality of filler particles.

In a particular embodiment, the second plurality of filler particles may be non-spherical, or have a shape factor less than 0.75, such as less than 0.7, less than 0.65, less than 0.6, less than 0.55, or even less than 0.5. The second plurality of filler particles may include fibers, strands, or other elongated bodies.

A ratio of filler particles to second filler particles may be at least 1:10, such as at least 1:5, at least 1:4, at least 1:3, at least 1:2, at least 1:1, at least 2:1, or even at least 3:1. In an embodiment, the ratio of filler particles to second filler particles may be no greater than 100:1, such as no greater than 50:1, no greater than 20:1, no greater than 10:1, or even no greater than 5:1.

In a particular embodiment, the ratio of filler particles to second filler particles is 1:1. In another particular embodiment, the ratio of filler particles to second filler particles is 4:1. In yet another particular embodiment, the ratio of filler particles to second filler particles is 1:4.

Embodiment 1

A linear motion assembly having a static coefficient of friction, $\mu_S$, as measured between an inner component and an outer component, and a dynamic coefficient of friction, $\mu_D$, as measured between the inner component and the outer component, wherein $\mu_S/\mu_D$ is less than 2.0, such as less than 1.9, less than 1.8, less than 1.7, or even less than 1.6.

Embodiment 2

A linear motion assembly having a static coefficient of friction, $\mu_S$, as measured between an inner component and an outer component, and a dynamic coefficient of friction, $\mu_D$, as measured between the inner component and the outer component, and wherein $\mu_S/\mu_D$ is less than 2.0, such as less than 1.9, less than 1.8, less than 1.7, or even less than 1.6 for at least 500 cycles, such as at least 1000 cycles, at least 5000 cycles, at least 10000 cycles, or even at least 100000 cycles, as measured according to the Stiction Test.

Embodiment 3

A linear motion assembly comprising:
an outer component defining a bore;
an inner component disposed within and translatable relative to the bore; and
a bearing disposed between the inner component and the outer component,
wherein the bearing has an initial average radial thickness, $T_I$, wherein the bearing has an average radial thickness, $T_E$, after 3,000,000 complete cycles, and wherein $T_I/T_E$ is at least 0.9, such as at least 0.91, at least 0.92, at least 0.93, at least 0.94, at least 0.95, at least 0.96, at least 0.97, at least 0.98, or even at least 0.99.

Embodiment 4

A linear motion assembly comprising:
an outer component defining a bore;
an inner component disposed within and translatable relative to the bore;
a bearing disposed between the inner component and the outer component; and
a lubricious fluid disposed within the bore of the outer component between the inner component and the outer component,
wherein the bearing has a static coefficient of friction, $\mu_S$, as measured between the inner component and the outer component, and a dynamic coefficient of friction, $\mu_D$, as measured between the inner component and the outer component, and wherein $\mu_S/\mu_D$ is less than 2.0, such as less than 1.9, less than 1.8, less than 1.7, or even less than 1.6.

Embodiment 5

A linear actuator comprising:
an outer component defining a bore;
an inner component disposed within and translatable relative to the bore;
a bearing disposed between the inner component and the outer component; and
a lubricious fluid disposed within the bore of the outer component between the inner component and the outer component,
wherein the bearing has a static coefficient of friction, $\mu_S$, as measured between the inner component and the outer component, and a dynamic coefficient of friction, $\mu_D$, as measured between the inner component and the outer component, and wherein $\mu_S/\mu_D$ is less than 2.0, such as less than 1.9, less than 1.8, less than 1.7, or even less than 1.6.

Embodiment 6

A suspension assembly comprising:
a stanchion;
a receiver having a bore adapted to receive a portion of the stanchion, the receiver and stanchion being longitudinally translatable with respect to one another
a bearing disposed between the stanchion and the receiver; and
a lubricious fluid disposed within an internal cavity between the stanchion and the receiver, wherein the bearing has a static coefficient of friction, $\mu_S$, as measured between the stanchion and the receiver, and a dynamic coefficient of friction, $\mu_D$, as measured between the stanchion and the receiver, and wherein $\mu_S/\mu_D$ is less than 2.0, such as less than 1.9, less than 1.8, less than 1.7, or even less than 1.6.

Embodiment 7

A suspension assembly comprising:
a stanchion comprising aluminum, magnesium, or a combination thereof;
a receiver having a bore adapted to receive a portion of the stanchion, the receiver and stanchion being longitudinally translatable with respect to one another
a bearing disposed between the stanchion and the receiver
wherein the suspension assembly has a static coefficient of friction, $\mu_S$, as measured between an inner component and an outer component, and a dynamic coefficient of friction, $\mu_D$, as measured between the inner component and the outer component, wherein $\mu_S/\mu_D$ is less than 2.0, such as less than 1.9, less than 1.8, less than 1.7, or even less than 1.6, and wherein substantially no visible scratches are present on the stanchion after 10000 cycles.

Embodiment 8

A suspension assembly comprising:
a stanchion;
a receiver having a bore adapted to receive a portion of the stanchion, the receiver and stanchion being longitudinally translatable with respect to one another; and
a bearing disposed between the stanchion and the receiver, the bearing comprising a filler including a plurality of filler particles, the filler particles having an average shape factor of no less than 0.75.

Embodiment 9

A suspension assembly comprising:
a stanchion disposed in and longitudinally translatable with respect to a receiver; and
a bearing disposed between the stanchion and the receiver, the bearing comprising a filler including a plurality of filler particles, each filler particle comprising a generally spherical shape.

Embodiment 10

The assembly according to any one of embodiments 1 and 2, further comprising a bearing disposed between the inner component and the outer component.

Embodiment 11

The suspension according to any one of embodiments 3-10, wherein the bearing comprises a backing coupled to a low friction layer.

Embodiment 12

The suspension according to embodiment 11, wherein the backing comprises a metal such as an aluminum or a steel.

Embodiment 13

The suspension according to any one of embodiments 11 and 12, wherein the backing is coupled to the low friction layer by an adhesive.

Embodiment 14

The suspension according to any one of embodiments 11-13, wherein the backing is disposed radially inside of the low friction layer.

Embodiment 15

The suspension according to any one of embodiments 11-13, wherein the backing is disposed radially outside of the low friction layer.

Embodiment 16

The suspension assembly according to any one of embodiments 3-15, wherein the bearing comprises a fluoropolymer, such as PTFE.

Embodiment 17

The suspension assembly according to embodiment 16, wherein the fluoropolymer comprises at least 10 vol % of the bearing, such as at least 20 vol %, at least 30 vol %, at least 40 vol %, or even at least 50 vol %.

Embodiment 18

The suspension according to any one of embodiments 16 and 17, wherein the fluoropolymer comprises no greater than 60 vol % of the bearing, such as no greater than 55 vol %.

Embodiment 19

The suspension assembly according to any one of embodiments 3-18, wherein the bearing comprises a filler including a plurality of filler particles.

Embodiment 20

The suspension assembly according to any one of embodiments 7-19, wherein the bearing comprises a generally homogenous composition.

Embodiment 21

The suspension assembly according to any one of embodiments 7-20, wherein the bearing comprises a homogenous composition.

Embodiment 22

The suspension assembly according to any one of embodiments 7-19, wherein the bearing comprises a non-uniform composition.

Embodiment 23

The suspension assembly according to embodiment 22, wherein the bearing has a first concentration of filler particles at a first location, a second concentration of filler particles at a second location, and wherein the first concentration is different than the second concentration.

Embodiment 24

The suspension assembly according to any one of embodiments 7-23, wherein the filler comprises at least 10 vol % of the bearing, such as at least 20 vol %, at least 30 vol %, at least 40 vol %, or even at least 50 vol %.

Embodiment 25

The suspension assembly according to any one of embodiments 7-24, wherein the filler comprises no greater than 60 vol % of the bearing, such as no greater than 55 vol %.

Embodiment 26

The suspension assembly according to any one of embodiments 7-25, wherein the filler further comprises a plurality of secondary filler particles, the secondary filler particles comprising fibrous strands.

Embodiment 27

The suspension assembly according to embodiment 26, wherein a ratio of filler particles to secondary filler particles is no less than 0.5:1, such as no less than 1:1, no less than 2:1, no less than 3:1, no less than 4:1, no less than 5:1, no less than 10:1, or even no less than 25:1.

Embodiment 28

The suspension assembly according to any one of embodiments 7-27, wherein the filler comprises a metal.

Embodiment 29

The suspension assembly according to any one of embodiments 7-28, wherein the filler comprises bronze.

Embodiment 30

The suspension assembly according to any one of embodiments 7-29, wherein the filler particles have an average shape factor of at least 0.80, such as at least 0.85, at least 0.9, at least 0.95, at least 0.96, at least 0.97, at least 0.98, or even at least 0.99.

Embodiment 31

The suspension assembly according to any one of embodiments 7-30, wherein the filler particles have an average shape factor of no greater than 1.0.

Embodiment 32

The suspension assembly according to any one of embodiments 7-31, wherein the assembly further comprises:
an internal cavity defined between the stanchion and the receiver; and
a lubricious fluid confined within the internal cavity,
wherein the bearing is disposed within the internal cavity in communication with the lubricious fluid.

Embodiment 33

The suspension assembly according to embodiment 32, wherein the lubricious fluid comprises an oil.

Embodiment 34

The suspension assembly according to any one of embodiments 32 and 33, wherein the internal cavity is in fluid isolation from an external environment by a seal.

Embodiment 35

The suspension assembly according to any one of the preceding embodiments, wherein the stanchion or inner component comprises a material selected from: an aluminum and a magnesium.

The suspension assembly according to any one of the preceding embodiments, wherein the stanchion or inner component is at least partially anodized such that the bearing contacts the stanchion or inner component at an anodized location therealong.

Embodiment 36

The suspension assembly according to any one of the preceding embodiments, wherein the assembly has a static coefficient of friction, $\mu_S$, and a dynamic coefficient of friction, $\mu_D$, and wherein $\mu_S/\mu_D$ is less than 2.0, such as less than 1.9, less than 1.8, less than 1.7, or even less than 1.6.

Embodiment 37

The suspension system according to embodiment 36, wherein $\mu_S/\mu_D$ is greater than 1.0.

The suspension assembly according to any one of the preceding embodiments, wherein the bearing has a zero-clearance condition between the stanchion and receiver or inner component and outer component such that the stanchion or inner component is devoid of perceptible radial play relative to the receiver or outer component.

Example

Two bearings were created for comparison of stiction performance. A first sample, S1, formed of an Ekonol filled PTFE; and a second sample, S2, formed of a spherical bronze filled PTFE. Samples S1 and S2 each contain an approximately equal ratio of filler particles to low friction material. That is, the ratio of Ekonol to PTFE (S1) and bronze to PTFE (S2) are approximately equal.

Sample S1 had an initial inner diameter of 32 mm, a sidewall thickness of 1.32 mm, and an axial height of 20 mm. The ratio of Ekonol to PTFE was approximately 27:73, with the mixture being approximately homogenous in distribution.

Sample S2 had an initial inner diameter of 32 mm, a sidewall thickness of 1.32 mm, and an axial height of 20 mm. The ratio of spherical bronze to PTFE was approximately 40:60, with the mixture being approximately homogenous in distribution.

Both samples were tested according to the same test using an E10000 Instron device calibrated to proper ASTM standards. The shaft of the E10000 Instron had a hard anodized finish with a surface roughness, Ra, of 0.15 microns.

Prior to positioning the samples in the E10000 Instron, oil was applied at room temperature to the shaft. Three different oils were used in conducting three iterations of the test for both samples. Oil 1 is a 10 wt. oil sold by Fox Head, Inc. under the trade name Gold. Oil 2 is a 10 wt. oil sold by Fox Head, Inc. under the trade name Green. Oil 3 is a 10 wt. oil sold by Fox Head, Inc. under the trade name Red.

In conducting the test, one of the samples was positioned radially between the shaft and a bore of the E10000 Instron. The sample was then statically loaded with 1.0 Mpa of radial pressure for five minutes. After five minutes the shaft was moved relative to the bore at 2 mm/s and measurements were taken. Between successive movements, the respective sample was statically loaded at 1.0 MPa for five minutes. After the first sample completed testing the second sample was tested using the same parameters.

Figure 4:
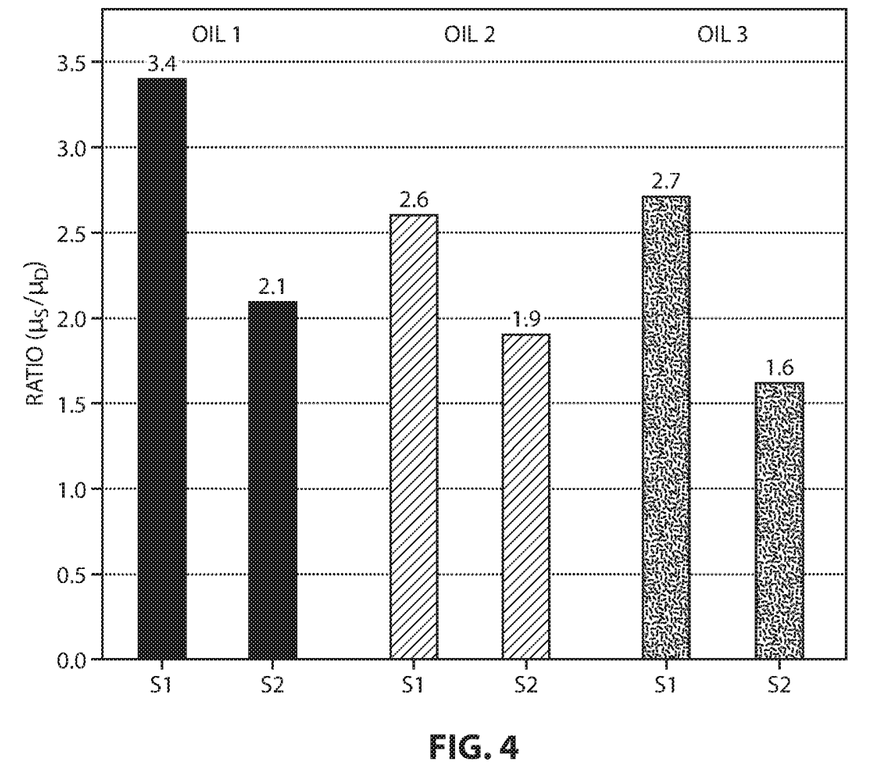
FIG. 4 includes a chart illustrating stiction conditions in suspension assemblies.

FIG. 4 includes a plot illustrating the representative data derived from the test of all three samples, each sample being tested using the three above-listed lubricants in separate tests. As illustrated, Sample S2 demonstrated the best stiction performance when using Red oil. That is, Sample S2 had a static/dynamic coefficient of friction ratio of 1.6 when tested using Red oil. Notably, Sample S2 exhibited reduced stiction performance as compared to Sample S1 using all three oil types. The relative stiction improvement of Sample S2 as compared to Sample S1 ranged between a 59% improvement and a 73% improvement using the three oil types. Average stiction reduction of Sample S2 over Sample S1 was approximately 65%.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A linear motion assembly comprising:
an outer component defining a bore;
an inner component disposed within and translatable relative to the bore;
a bearing disposed between the inner component and the outer component; and
a lubricious fluid disposed within the bore of the outer component between the inner component and the outer component,
wherein the bearing has a static coefficient of friction, $\mu_S$, as measured between the inner component and the outer component, and a dynamic coefficient of friction, $\mu_D$, as measured between the inner component and the outer component, and wherein $\mu_S/\mu_D$ is less than 2.0, wherein the bearing comprises a filler including a plurality of filler particles, and wherein the filler particles having an average shape factor of no less than 0.75, wherein the filler particles comprise bronze.

2. The assembly according to claim 1, wherein the bearing comprises a backing coupled to a low friction layer.

3. The assembly according to claim 2, wherein the backing comprises a metal.

4. The assembly according to claim 1, wherein the bearing comprises a fluoropolymer.

5. The assembly according to claim 4, wherein the fluoropolymer comprises at least 10 vol % of the bearing.

6. The assembly according to claim 1, wherein the filler comprises at least 10 vol % of the bearing.

7. The assembly according to claim 1, wherein the filler further comprises a plurality of secondary filler particles, the secondary filler particles comprising fibrous strands.

8. The suspension assembly according to claim 7, wherein a ratio of filler particles to secondary filler particles is no less than 0.5:1.

9. A suspension assembly comprising:
a stanchion;
a receiver having a bore adapted to receive a portion of the stanchion, the receiver and stanchion being longitudinally translatable with respect to one another; and
a bearing disposed between the stanchion and the receiver, the bearing comprising a filler including a plurality of filler particles, the filler particles having an average shape factor of no less than 0.75, wherein the filler particles comprise bronze.

10. The assembly according to claim 9, wherein the bearing has a first concentration of filler particles at a first location, a second concentration of filler particles at a second location, and wherein the first concentration is different than the second concentration.

11. The assembly according to claim 9, wherein the filler further comprises a plurality of secondary filler particles, the secondary filler particles comprising fibrous strands.

12. The assembly according to claim 11, wherein a ratio of filler particles to secondary filler particles is no less than 0.5:1.

13. The assembly according to claim 9, wherein the assembly has a static coefficient of friction, $\mu_S$, and a dynamic coefficient of friction, $\mu_D$, wherein $\mu_S/\mu_D$ is less than 2.0.

14. A suspension assembly comprising:
a stanchion;
a receiver having a bore adapted to receive a portion of the stanchion, the receiver and stanchion being longitudinally translatable with respect to one another
a bearing disposed between the stanchion and the receiver; and a lubricious fluid disposed within an internal cavity between the stanchion and the receiver, wherein the bearing has a static coefficient of friction, $\mu_S$, as measured between the stanchion and the receiver, and a dynamic coefficient of friction, as measured between the stanchion and the receiver, and wherein $\mu_S/\mu_D$ is less than 2.0, wherein the bearing comprises a filler including a plurality of filler particles, and wherein the filler particles having an average shape factor of no less than 0.75, wherein the filler particles comprise bronze.

15. The assembly according to claim 14, wherein the assembly further comprises:
   an internal cavity defined between the stanchion and the receiver; and
   a lubricious fluid confined within the internal cavity,
   wherein the bearing is disposed within the internal cavity in communication with the lubricious fluid.

16. The assembly according to claim 15, wherein the lubricious fluid comprises an oil.

17. The assembly according to claim 14, wherein the bearing has a zero-clearance condition between the stanchion and receiver.

18. The assembly according to claim 14, wherein the stanchion comprises an aluminum, a magnesium, or a combination thereof.

* * * * *

UNITED STATES PATENT AND TRADEMARK OFFICE
CERTIFICATE OF CORRECTION

PATENT NO. : 10,670,101 B2
APPLICATION NO. : 15/741078
DATED : June 2, 2020
INVENTOR(S) : Nicholas F. Witting et al.

It is certified that error appears in the above-identified patent and that said Letters Patent is hereby corrected as shown below:

On the Title Page

Column 2, item [56], page 2, Line 7, delete "Slydwaye" and insert --Slydway®--

In the Claims

Column 15, Line 5, Claim 14 delete "friction, as measured" and insert --friction, $\mu_D$, as measured--

Signed and Sealed this
Fourteenth Day of June, 2022

Katherine Kelly Vidal
*Director of the United States Patent and Trademark Office*